US010878686B1

(12) United States Patent
Pederson et al.

(10) Patent No.: US 10,878,686 B1
(45) Date of Patent: Dec. 29, 2020

(54) BADGE HOLDER WITH ONE TOUCH COMMUNICATION

(71) Applicant: Badge Messenger Inc., Sauk Rapids, MN (US)

(72) Inventors: Gregory A. Pederson, Saint Cloud, MN (US); Michael J. Muggli, Sauk Rapids, MN (US); Stephanie M. Pederson, Saint Cloud, MN (US); David G. Sexton, Rice, MN (US); Hans A. Mersinger, Saint Cloud, MN (US)

(73) Assignee: Badge Messenger Inc., Sauk Rapids, MN (US)

( * ) Notice: Subject to any disclaimer, the term of this patent is extended or adjusted under 35 U.S.C. 154(b) by 0 days.

(21) Appl. No.: 16/362,556

(22) Filed: Mar. 22, 2019

Related U.S. Application Data

(60) Provisional application No. 62/648,161, filed on Mar. 26, 2018.

(51) Int. Cl.
| | |
|---|---|
| *G08B 25/01* | (2006.01) |
| *G09F 3/20* | (2006.01) |
| *A44C 3/00* | (2006.01) |
| *G08B 21/02* | (2006.01) |
| *G08B 6/00* | (2006.01) |
| *G08B 25/00* | (2006.01) |
| *H04W 64/00* | (2009.01) |

(52) U.S. Cl.
CPC ........... *G08B 25/016* (2013.01); *A44C 3/001* (2013.01); *G08B 6/00* (2013.01); *G08B 21/02* (2013.01); *G08B 25/007* (2013.01); *G09F 3/207* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 4,347,501 A | 8/1982 | Akerberg | |
| 4,647,714 A * | 3/1987 | Goto | ........................ B32B 15/04 174/36 |
| 4,998,095 A | 3/1991 | Shields | |
| 5,125,505 A * | 6/1992 | Kurosaki | ................... G09F 3/18 206/39.4 |
| 5,218,344 A | 6/1993 | Ricketts | |
| | (Continued) | | |

*Primary Examiner* — Fekadeselassie Girma
(74) *Attorney, Agent, or Firm* — Albert W. Watkins (57) ABSTRACT

A badge holder is carried upon a person and has a pocket to contain and display an identification badge. A plurality of switches are provided, in a preferred embodiment discretely accessible on the rear face of the holder, opposite to the badge. Each of the switches presents a unique tactile configuration that enables the person to identify and activate a selected switch entirely by touch, which will initiate a desired communication with a command center. The command center will determine from the communication, which preferably uniquely identifies the selected switch, the badge holder, the badge holder location, and what actions are desired by the person. These actions will then be communicated from the command center to other devices for handling by appropriate personnel. The communications may further include text, audio, or video files, where appropriate.

19 Claims, 2 Drawing Sheets

(56) References Cited

U.S. PATENT DOCUMENTS

| | | | |
|---|---|---|---|
| 5,365,217 A * | 11/1994 | Toner | G08B 25/009 |
| | | | 340/531 |
| 5,438,315 A | 8/1995 | Nix | |
| 5,493,692 A | 2/1996 | Theimer et al. | |
| 5,596,313 A | 1/1997 | Berglund et al. | |
| 5,705,980 A | 1/1998 | Shapiro | |
| 5,742,233 A | 4/1998 | Hoffman et al. | |
| 5,767,788 A | 6/1998 | Ness | |
| 5,790,022 A | 8/1998 | Delvecchio et al. | |
| 5,828,292 A * | 10/1998 | Kokhan | G08B 25/016 |
| | | | 340/307 |
| 6,121,544 A * | 9/2000 | Petsinger | G06K 19/005 |
| | | | 150/147 |
| 6,127,938 A * | 10/2000 | Friedman | G07B 15/063 |
| | | | 206/720 |
| 6,155,410 A * | 12/2000 | Davis | A45C 11/182 |
| | | | 150/147 |
| 6,169,494 B1 | 1/2001 | Lopes | |
| 6,175,308 B1 | 1/2001 | Tallman et al. | |
| 6,643,516 B1 | 11/2003 | Stewart | |
| 6,714,133 B2 | 3/2004 | Hum et al. | |
| 6,838,992 B2 | 1/2005 | Tenarvitz | |
| 6,845,863 B1 * | 1/2005 | Riley | A45C 11/182 |
| | | | 150/147 |
| 6,894,612 B2 | 5/2005 | Xydis | |
| 6,970,092 B2 | 11/2005 | Hum et al. | |
| 6,992,566 B2 | 1/2006 | Striemer | |
| 7,042,337 B2 | 5/2006 | Borders et al. | |
| 7,161,479 B2 | 1/2007 | Sobol | |
| 7,243,840 B2 * | 7/2007 | Bason | G06K 19/025 |
| | | | 235/375 |
| 7,315,535 B2 | 1/2008 | Schuman | |
| 7,327,252 B2 | 2/2008 | Goehler | |
| 7,394,386 B2 | 7/2008 | Nowlan | |
| 7,460,020 B2 | 12/2008 | Reyes et al. | |
| 7,635,089 B2 * | 12/2009 | Augustinowicz | G06K 19/07327 |
| | | | 235/486 |
| 7,715,387 B2 | 5/2010 | Schuman | |
| 7,804,412 B2 | 9/2010 | Derrick et al. | |
| 7,980,458 B2 * | 7/2011 | Kon | G06Q 20/10 |
| | | | 235/375 |
| 8,038,068 B2 * | 10/2011 | Yuzon | G07F 7/1016 |
| | | | 235/492 |
| 8,149,112 B2 | 4/2012 | Schlager et al. | |
| 8,212,653 B1 * | 7/2012 | Goldstein | G08B 21/245 |
| | | | 340/10.1 |
| 8,578,982 B2 * | 11/2013 | Lee | G06K 19/07327 |
| | | | 150/147 |
| 8,604,995 B2 * | 12/2013 | Hammad | G06F 1/1698 |
| | | | 343/841 |
| 8,723,675 B2 * | 5/2014 | Augustinowicz | G06K 19/005 |
| | | | 340/572.8 |
| 8,763,913 B2 * | 7/2014 | Alo | G06K 19/07327 |
| | | | 235/492 |
| 8,957,774 B2 | 2/2015 | Goldblatt | |
| 9,135,478 B2 * | 9/2015 | Burns | G06K 7/0021 |
| 9,265,331 B1 * | 2/2016 | Hoffman | A45F 5/00 |
| 9,613,353 B1 * | 4/2017 | Quigley | G06Q 20/405 |
| 9,697,453 B2 * | 7/2017 | Augustinowicz | |
| | | | G06K 19/07318 |
| 9,726,750 B2 * | 8/2017 | Gross | G01S 19/48 |
| 10,475,323 B1 * | 11/2019 | Ross | H04W 4/14 |
| 2002/0177471 A1 * | 11/2002 | Kaaresoja | G08B 6/00 |
| | | | 455/567 |
| 2004/0148837 A1 * | 8/2004 | Lewis | G09F 3/20 |
| | | | 40/654.01 |
| 2006/0017570 A1 * | 1/2006 | Moskowitz | G06K 19/07327 |
| | | | 340/572.7 |
| 2008/0121321 A1 * | 5/2008 | Tiner | A45C 13/02 |
| | | | 150/131 |
| 2008/0310850 A1 | 12/2008 | Pederson et al. | |
| 2010/0265084 A1 * | 10/2010 | Augustinowicz | |
| | | | G06K 19/07741 |
| | | | 340/686.6 |
| 2011/0068918 A1 * | 3/2011 | Cummings | G08B 21/02 |
| | | | 340/540 |
| 2011/0319048 A1 * | 12/2011 | Matlock | G08B 25/016 |
| | | | 455/404.1 |
| 2012/0079750 A1 * | 4/2012 | Lawrence | G09F 3/207 |
| | | | 40/1.5 |
| 2012/0228020 A1 * | 9/2012 | Winch | H05K 9/0043 |
| | | | 174/378 |
| 2013/0220842 A1 * | 8/2013 | Lazott | A45C 11/18 |
| | | | 206/39.4 |
| 2013/0306738 A1 * | 11/2013 | Peterson | H05B 47/105 |
| | | | 235/492 |
| 2013/0346333 A1 | 12/2013 | Hassler et al. | |
| 2014/0289844 A1 * | 9/2014 | Suwald | G07F 7/10 |
| | | | 726/20 |
| 2014/0289845 A1 * | 9/2014 | Suwald | G06K 9/00167 |
| | | | 726/20 |
| 2014/0365574 A1 | 12/2014 | Franks et al. | |
| 2014/0380452 A1 * | 12/2014 | Suwald | G07C 9/257 |
| | | | 726/9 |
| 2015/0057981 A1 * | 2/2015 | Gross | G01S 19/48 |
| | | | 703/1 |
| 2015/0124089 A1 * | 5/2015 | Swallow | B42D 25/324 |
| | | | 348/143 |
| 2015/0137942 A1 * | 5/2015 | Suwald | G06F 21/34 |
| | | | 340/5.65 |
| 2015/0156301 A1 * | 6/2015 | Crawford | H04M 1/21 |
| | | | 455/420 |
| 2016/0240075 A1 * | 8/2016 | Eisenman | H04W 4/90 |
| 2017/0079257 A1 * | 3/2017 | Haensgen | H04W 84/18 |
| 2019/0095735 A1 * | 3/2019 | Shah | G06F 21/36 |
| 2019/0096289 A1 * | 3/2019 | Harkness | G08B 21/02 |
| 2019/0278893 A1 * | 9/2019 | Eisen | G06F 3/03547 |

* cited by examiner

BADGE HOLDER WITH ONE TOUCH COMMUNICATION

CROSS REFERENCE TO RELATED APPLICATIONS

The present application claims the benefit of U.S. provisional patent application 62/648,161 filed Mar. 26, 2018 of like title, the teachings and entire contents which are incorporated herein by reference.

BACKGROUND OF THE INVENTION

1. Field of the Invention

This invention pertains generally to the field of telecommunications, and in one particularly preferred manifestation to location discerning radiotelephone systems that selectively provide service requests, emergency, or alarm communications, each with single touch activation.

2. Description of the Related Art

In times of need, a person will desire to signal to other appropriate persons to gain assistance. This is true in many life situations, both in employment and during personal time.

Sight-based signaling systems such as excitedly waving arms, selectively displayed lights from lanterns or candles, selectively flown flags, smoke signals, and the like have been used likely since the beginning of human history. Many of these along with more modern related light-based systems continue to be used today, including for exemplary purpose the well-known flashing lights that may signal an emergency or a machine malfunction, either which may require emergency assistance, or a lesser event such as the completion of a machine cycle that requires the attention of a person. Unfortunately, sight-based signaling systems tend to be sensitive to weather conditions such as rain or fog that could block clear vision. In addition, these systems also require the signaled party to actually look in the direction of the signal, and to have sufficient visual acuity to discern the signal. Depending upon the location and activity of the person being signaled, gaining their attention could be quite difficult at times.

Sound generation has also been a common signaling method, also likely since the beginning of human history. In addition to the simple loud voice, apparatus such as horns, bugles, and even dinner bell triangles have been used. Modern sound systems such as the well-known fire alarm can signal the need to evacuate a building, to gain the assistance of on-site personnel and to also provide quick identification of the building in trouble through exterior bells to a fire department or the like. One benefit of such systems is the ability for a person to hear the signal regardless of the direction they may be looking. Further, the sound may be sufficiently unique to gain a person's attention even if there are other louder sounds in their immediate vicinity. Nevertheless, and as may be appreciated, such devices are limited to good auditory reception, meaning they tend to be limited to relatively short distances and times where there are not overriding louder sounds, and to persons having adequate auditory acuity.

Some systems have combined these to better gain the necessary assistance. For example, machine signals often provide a combination of a bell or horn together with a flashing light, the combination which is often more effective at gaining the attention of persons who can provide assistance together with rapid location of the machine or person in need of assistance. Another example is an airline steward call button, which generates a sound and lights the button above the passenger in need of assistance. Similar systems are provided in hospitals that enable patients to call a nurse. The apparatus that enables such signaling has evolved over time, in part reflecting the capabilities of the devices and systems of the time, and in part reflecting on the great creativity of the artisans of the time. The apparatus has expanded from light and sound transmission such as the steward and nurse call buttons described herein above into electrical transmission.

During the last century, telecommunications systems have greatly expanded a person's ability to signal the need for assistance. Through a modern telecommunications system, a person in need of assistance can dial a number and be connected to a particular person, business, or institution that may provide the needed assistance. To speed access to emergency assistance, the emergency 9-1-1 system was implemented that only requires a person to press three digits on their telephone. This has been extremely beneficial and successful, and so has been adopted nation wide within the United States. As a result, regardless of a person's location and whether they are in their familiar home or traveling in a different state on vacation, they do not have to learn or search for the particular type of emergency assistance. Instead, they may always know that by dialing 9-1-1, they can access many types of emergency assistance. Unfortunately, there remain some times where a person may not have ready access to a telephone, or where they may find themselves in a situation where accessing a nearby telephone may be difficult or impossible or detrimental to the situation.

Owing to their great flexibility in programming and function, and ability to communicate rapidly through networks that reach most all locations, developers have further expanded upon the 9-1-1 telecommunications system by developing a variety of apps for cellular telephones that enable a person to very quickly call a friend, a cab or rideshare service, or emergency numbers such as the police or fire department or the more general 9-1-1 system. Like the 9-1-1 system, they necessarily require the person to have access to a cellular telephone. Also like the 9-1-1 system, there remain some times where a person may not have ready access to a cellular telephone, or where they may find themselves in a situation where accessing a nearby telephone may be difficult or impossible or detrimental to the situation.

One situation that highlights the deficiency of the 9-1-1 system is when a person either due to advanced age or physical or mental impairment may be in need and not be able to gain access to a telephone. Exemplary is in the event of a fall, they may be either unconscious, confused, or injured, and so cannot access the standard telecommunications system when they most need it. Recognizing this deficiency of the 9-1-1 system, artisans have designed a wearable device with a single button that may be pushed to initiate a call for help. This device may further be provided with sensory capability, such as an inertial sensor that might be used to indicate a fall. If not accompanied by an immediate button push, the device may self-initiate a call for assistance. Like the telecommunications systems described herein above, these devices have provided enormous benefit to a particular and substantial portion of the population. Exemplary U.S. patents and published applications, the teachings which are incorporated herein by reference, include: U.S. Pat. No. 4,347,501 by Akerberg, entitled "Installation for transmitting alarm signals"; U.S. Pat. No. 4,998,095 by Shields, entitled "Emergency transmitter system"; U.S. Pat. No. 5,218,344 by Ricketts, entitled "Method and system for monitoring personnel"; U.S. Pat. No. 5,438,315 by Nix, entitled "Security alarm system"; U.S. Pat. No. 5,596,313 by Berglund et al, entitled "Dual power security location system"; U.S. Pat. No. 5,705,980 by Shapiro, entitled "Method and apparatus for summoning police or security personnel for assistance in an emergency situation"; U.S. Pat. No. 5,767,788 by Ness, entitled "Computer aided dispatch and locator cellular system"; U.S. Pat. No. 5,790,022 by Delvecchio et al, entitled "Security tracking system"; U.S. Pat. No. 6,169,494 by Lopes, entitled "Biotelemetry locator"; U.S. Pat. No. 6,643,516 by Stewart, entitled "Telephone system and method with background location response capability"; U.S. Pat. No. 7,315,535 by Schuman, entitled "Information management system for bed data"; U.S. Pat. No. 7,327,252 by Goehler, entitled "Emergency rescuer tracking system and method"; U.S. Pat. No. 7,394,386 by Nowlan, entitled "Location signaling for transport system"; U.S. Pat. No. 7,715,387 by Schuman, entitled "Healthcare computer system with intra-room network"; U.S. Pat. No. 7,804,412 by Derrick et al, entitled "Remote tracking and communication device"; U.S. Pat. No. 8,149,112 by Schlager et al, entitled "Multi-hazard alarm system using selectable power-level transmission and localization"; and U.S. Pat. No. 8,957,774 by Goldblatt, entitled "Concealed Personal alarm and method".

Other exemplary U.S. patents of notable relevance, the teachings which are incorporated herein by reference, include: U.S. Pat. No. 5,742,233 by Hoffman et al, entitled "Personal security and tracking system"; U.S. Pat. No. 6,175,308 by Tallman et al, entitled "Personal duress security system"; U.S. Pat. No. 6,894,612 by Xydis, entitled "Monitoring method and system"; U.S. Pat. No. 6,992,566 by Striemer, entitled "Modular school computer system and method"; and U.S. Pat. No. 7,042,337 by Borders et al, entitled "Communication and data entry device".

Just as the 9-1-1 system drastically reduced the need for presses to dial a number and simplified the teaching and training required for persons to universally adopt and effectively use the system, there remains a need for further simplification, but with the flexibility to quickly select appropriate assistance using equipment that will always be immediately available, and which will not require a person to divert sight or focus from the situation at hand. The single button wearable of the prior art does not provide the user a way to distinguish the type of help required, and so will always signal an emergency. As may be appreciated, such emergency calls require dedication of substantial resource to ensure that they are always immediately answered. In other words, there is no way to separate one need from another, and all must therefore be treated as critical emergency. As a result, a low priority need may block or supercede a critical emergency, and thereby delay response. As may be appreciated then, existing systems fail to meet this combination of requirements.

One particular example where such competing needs exist is in the school environment. In most classrooms, the teacher is the sole person of authority. While in many situations these highly skilled and trained teachers can control the situation without assistance, there are several types of events that may require assistance. Some types of assistance can be provided, for exemplary purposes, by a teacher's aid, a janitor, or building security.

There are many situations where a teacher must maintain focus on the situation at hand to maintain control or safety, and if they lose focus or have to move to a different location to request assistance, the situation may escalate. Even the seemingly mundane need for janitorial assistance may in some instances still require the full attention of the teacher. Cleanup from glass breakage or vomit can present an unsafe condition for the students. As a result, the teacher will most desirably remain with full attention on the hazard, to prevent students from exposure. A similar situation exist when a teacher is trying to calm a student who is enraged or otherwise on the verge of losing control. The teacher must attempt to maintain eye contact, and try to de-escalate the situation. A stranger in the building may similarly need to be watched by the teacher until security can determine the intent of the stranger. Student fights and a myriad of other instances too numerous to explicitly mention each benefit from the eye contact and presence of the teacher.

Recognizing the diverse requirements a teacher faces, several highly skilled artisans have designed systems and apparatus specially tailored to schools. Exemplary U.S. patents and published applications, the teachings which are incorporated herein by reference, include: 2013/0346333 by Hassler et al, entitled "Systems and method for receiving requests and responding to emergencies"; 2014/0365574 by Franks et al, entitled "System and method for incident reporting and notification"; and 7,460,020 by Reyes et al, entitled "Computer-enabled, networked, facility emergency notification, management and alarm system".

While these systems and apparatus offer much advantage over the prior art intercom systems commonly in use in schools, the menus and data entry required by these systems fail to truly address the needs of the teachers. In many situations such as those outlined herein above, the teacher simply cannot lose focus or spend time working through the menus.

These systems, and other prior art systems also fail due to an additional and very important limitation. Using these prior art telecommunications systems, the teacher must first locate and access the telecommunications device. This is true whether it is an in-room wired intercom or telephone, a cellular telephone, or a walkie-talkie or similar radio telephone apparatus. In the process of locating and accessing, precious time will be lost. In addition, the teacher may lose attention and sight line with the hazard.

Even if the teacher is in fact carrying a suitable device such as a cellular telephone or walkie-talkie on their person, such as in a pocket, they must first retrieve the device. This will at least slow down their call for assistance, and can in some extreme situations make them undesirably vulnerable or cause them to lose sight of the situation. Once retrieved, in the case of a cellular smartphone, they must look at the display screen and work through the necessary displays and menus to select the correct type of assistance. Again, they will be slowed and may potentially be vulnerable or otherwise lose control due to loss of eye contact.

In the case of a walkie-talkie, they are working through a common communications channel. While they may be in need of janitorial assistance, another teacher or location in the school may experience a more serious emergency that may either more seriously affect a single student, such as a medical emergency, or seriously affect many more students or even the entire school. Consequently, a walkie-talkie or intercom that is not able to differentiate the type of need may undesirably be jammed when most needed. Further, a perpetrator familiar with the system may also readily block critical transmission, by accessing only a single device and keeping it "off-hook" or in perpetual transmission mode. Even a cellular telephone network, in the event of an extreme event, is readily overloaded by the simultaneous access of a substantial number of the cellular telephones within a building or vicinity. This is unfortunately all too common during major events such as earthquakes, fires, and the presence of hostile persons. At such times, even these systems which are designed for many simultaneous users may be unavailable to the teachers, who are the very people best trained to appropriately deal with the situation and communicate their needs.

There is another potentially serious shortcoming with prior art smart phone, walkie-talkie, and like telecommunications systems. These devices are prone to noise and chatter, which can come at extremely in-opportune moments such as the aforementioned enraged student, broken glass, or stranger in the building. Even if the teacher is not distracted, the noise and chatter may, for exemplary purposes, cause the enraged student to distract from the calming teacher and escalate the situation, the students adjacent broken glass to jump and potentially adversely interact with the glass, or the stranger to look at and recognize that the teacher is watching and do something rash in response.

In the specific case of a smart phone, there will always be a variety of incoming calls, notifications, and text messages, each that can disrupt focus and attention. In order to function effectively in the classroom, the teacher will simply disregard these incoming distractions. Unfortunately, one of those may be a critical alert coming from the office, for exemplary purpose notifying the teacher of an emergency. In the case of a walkie-talkie system, the lack of selective communication means that either there will be chatter over the devices every time any teacher needs assistance, or the devices must be restricted to catastrophic single event purpose, such as an emergency evacuation or lock-down. As should be apparent, these devices simply fail to meet the needs of a school and classroom teachers.

There are some exemplary apparatus created by highly skilled artisans that do not require a separate telecommunications device, and which instead are incorporated directly into an identification badge. Exemplary U.S. patents, the teachings which are incorporated herein by reference, include: U.S. Pat. No. 6,838,992 by Tenarvitz, entitled "Methods and systems for locating subjects and providing event notification within a tracking environment and badge for use therein"; and U.S. Pat. No. 8,188,878 by Pederson et al, entitled "LED Light communication system". While these overcome some of the limitations of the prior art, and in spite of the enormous advancements and substantial research and development that has been conducted, the prior art systems and apparatus still fail to address the combined need for ready manipulation and selective communications, while allowing the teacher or other persons to keep visual contact with the need, threat, or danger, while still reliably requesting the appropriate form of assistance.

Additional patents of varying relevance, the relevant teachings and contents which are incorporated herein by reference, include: U.S. Pat. No. 5,493,692 by Theimer et al, entitled "Selective delivery of electronic messages in a multiple computer system based on context and environment of a user"; U.S. Pat. No. 6,714,133 by Hum et al, entitled "Short range communication system"; U.S. Pat. No. 6,970,092 by Hum et al, entitled "Short range communication system"; and U.S. Pat. No. 7,161,479 by Sobol, entitled "Portable instantaneous wireless even based photo identification and alerting security system".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a messaging system. The system includes, in combination, at least one badge holder and a command center. The at least one badge holder has a pocket configured to receive an identification badge. A coupling is configured to affix the badge holder with a person while displaying the identification badge. The badge holder also has a plurality of switches, and communications circuitry operative responsive to single touch activation of a one of the plurality of switches to initiate communications with the command center, the communication uniquely identifying at least a location of the at least one badge holder and at least one indicator of desired action. The command center has communications circuitry operative to communicate with the at least one badge holder; and processor circuitry configured to generate actions and communications responsive to the communications with the at least one badge holder identifying at least a location of the at least one badge holder and at least one indicator of desired action.

In a second manifestation, the invention is a badge holder. A housing has a front face, and a rear face opposed to the front face. An identification badge is visible on the housing front face. A coupling is configured to affix the badge holder with a person while displaying the identification badge. The badge holder also has a plurality of switches accessible on the housing rear face, and communications circuitry operative responsive to single touch activation of a one of the plurality of switches to initiate communications with a command center, the communication uniquely identifying at least the at least one badge holder and at least one indicator of desired action.

In a third manifestation, the invention is a badge holder. A housing has a front face, and a rear face opposed to the front face. A pocket adjacent the front face is configured to receive and contain an identification badge while visibly displaying the identification badge at the housing front face. A coupling is configured to affix the badge holder with a person while displaying the identification badge. The badge holder also has a plurality of switches, and communications circuitry operative responsive to single touch activation of a one of the plurality of switches to initiate communications with the command center, the communication uniquely identifying at least a location of the at least one badge holder and at least one indicator of desired action.

OBJECTS OF THE INVENTION

Exemplary embodiments of the present invention solve inadequacies of the prior art by providing a badge holder that will be carried upon a person while displaying an identification badge with a plurality of switches. Each of the switches presents a unique tactile configuration that enables the person to readily identify and activate a selected switch entirely by touch, the switch which will initiate a desired communication with a command center. The command center will determine from the communication, which uniquely identifies the selected switch and the badge holder, what actions should be taken. These actions will then be communicated to other devices for handling by appropriate personnel. The communications may further include text, audio, or video files, where appropriate.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a system and apparatus beneficial to schools and for other potentially complex and demanding environments that will naturally and intrinsically be immediately available to appropriate personnel. A second object of the invention is to provide the aforementioned system and apparatus that can be selectively activated dependent upon the type of assistance required, and that is simple to use and may be operated without requiring diversion of vision. Another object of the present invention is for the system and apparatus to continue to operate in spite of power outages or cellular congestion possible in emergency situations, independent of the operational status of public telecommunications, ordinary building networks, and external power. A further object of the invention is to signal through ordinary buildings and spaces without alteration thereto. Yet another object of the present invention is to signal independently of the status of other like apparatus in real time, and to promptly communicate the need for assistance regardless of whether there is a person available at the other end of the communication channel at the instant of signaling the need for assistance.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in a preferred embodiment of the invention, badge holder with one touch communication 10 is illustrated in FIGS. 1-4. In another preferred embodiment of the invention illustrated in FIG. 5, the present invention provides a messaging system 1 including at least one badge holder with one touch communication 10 in combination with a command center 40.

Badge holder 10 is comprised of a housing 20 having an at least partially transparent front face 21, a back face 22, and a lanyard coupling 23 adjacent to the top edge of the juncture between the front and back faces 21, 22. While a lanyard coupling 23 is illustrated, any suitable coupling that enables badge holder 10 to be supported by and displayed upon a person is preferred. Retained just behind front face 21 within badge pocket 24' and visible through face 21 is a prior art identification or security badge 2. Badge 2 may, for exemplary and non-limiting purpose, comprise a photo identification that may optionally further incorporate various optical or electronic security features, including but not limited to RF-ID chips, bar codes, and other electronic identifiers known in the art. While not so illustrated in FIG. 4, in some embodiments badge pocket 24' is configured to hold a plurality of badges, which may for exemplary purpose include identification badges, access badges and the like that might be required by a particular institution.

As is well established in building security, identification badges allow easy identification of persons who are authorized to be in a building. However, in order to be effective, these identification badges must be prominently displayed at all times. This means that the identification badge 2 will be required to be carried and visibly displayed by the person.

In consideration thereof and in accord with the teachings of the present invention, an employee such as a teacher within a school will be provided with a suitable prior art coupling such as a lanyard, spring clip and strap, or other apparatus that will allow badge holder 10 to be supported by and displayed upon a person. Identification badge 2, which may for exemplary and non-limiting purpose be a prior art badge already in use at the school or institution, is inserted into badge pocket 24' and will be visible through at least partially transparent face 21.

Figure 3:
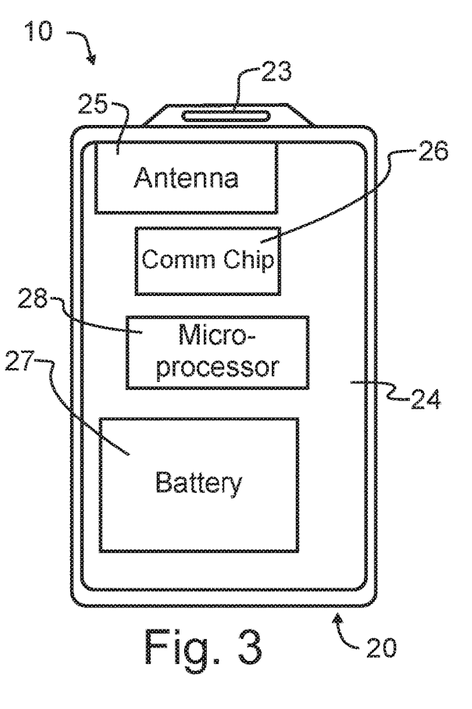
FIG. 3 illustrates the preferred embodiment badge holder with one touch communication of FIG. 1 with the badge compartment and badge removed to reveal block diagram illustration of electronic components contained therein.

Within an interior of housing 20, such as within an electronics compartment 24 as illustrated in FIG. 3, a plurality of electronic components are housed that for exemplary and non-limiting purpose comprise an antenna 25, a communications chip 26, a rechargeable battery 27, and a microprocessor 28. Other components that are beneficial in the function and operation of badge holder 10 will also be provided, as will be understood by those skilled in electrical communications.

Figure 1:
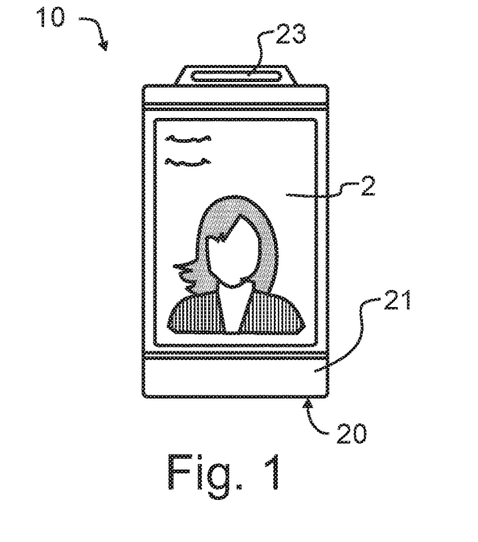
FIGS. 1 and 2 illustrate a preferred embodiment badge holder with one touch communication designed in accord with the teachings of the present invention from front and back elevational views, respectively.
Figure 2:
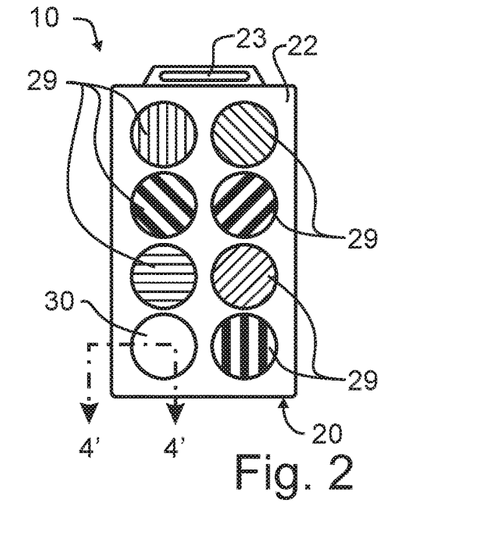

Provided on the back face 22 of badge holder 10 are a plurality of switches 29. As illustrated, there are seven of these, though more or fewer switches may alternatively be provided, depending upon the needs of a particular facility or institution as will be explained further herein below.

In addition to one or more switches 29, a uniquely identifiable emergency switch 30 is also preferably provided. For exemplary purpose, switch 30 is illustrated in the sectional view of FIG. 4 as having a resilient domed cover 32 coated with an electrically conductive contact material 33 on an interior surface. When inactive, domed cover 32 and contact material 33 are spaced from electrically conductive contact 38 by a small air gap 36. However, when a person depresses resilient domed cover 32, domed cover 32 will deform, ultimately allowing contact material 33 to come into contact with contact 38. This contact, as is known in the electrical switch art, can then be used through additional traces formed on either surface but most commonly adjacent to contact 38 to complete a circuit formed by additional components such as might for exemplary purposes be contained within electronics compartment 24. Closing switch 30 in preferred embodiment badge holder 10 will then have the effect of energizing communications chip 26 to generate a transmission signal induced within antenna 25.

The provision of at least two switches such as a switch 29 and switch 30, or in an alternative embodiment a plurality of switches 29 and absent a switch 30, enables a person to selectively communicate with at least two different recipients. As will then be implicitly understood, each one of the plurality of switches 29, 30 may be programmed to generate a unique or distinct transmission responsive to the particular switch pressed, and so can be used to signal a different need or action. Most preferably, the unique or distinct transmission will likewise generate a unique or distinct identifier that can be solely associated with only one badge holder 10. In many embodiments, a location identifier will also be provided that designates the current location of the transmitting badge holder 10. However, in some embodiments a particular employee will be understood to be at a particular location for a particular type of request, and so location information will be unnecessary in some embodiments. One example of this is a classroom, where a teacher has requested janitorial assistance. The classroom may be inferred by the teacher assignment. In such case, the identification of the owner or person associated with the badge holder may uniquely identify the location.

Since identification badge 2 is required to be carried and visibly displayed by the person, the badge holder 10 will also be carried by the person, and will be readily accessible at all times. This means that the person has immediate access to switches 29. Furthermore, the person will be able to reach and push one or more of switches 29, 30 without having to look directly at badge holder 10.

Because of the simple geometry of the badge, a person may readily locate any of the four corner switches by simply touching the adjacent corner, and then sliding their finger inward toward the center of rear face 22 until the first switch is encountered. Each of these four corner switches thereby presents a unique tactile configuration that enables the person to readily identify and activate a selected switch entirely by touch, the switch which will initiate a desired communication with a command center. In view of this simple locating, up to four switches may be provided that instantaneously will be very readily identifiable simply based upon location. A person will not have to look at preferred embodiment badge holder 10 to determine what switch they are pushing, and may instead elect to keep their eyes and focus elsewhere.

While not essential to the present invention, in preferred embodiment badge holder 10 four more switches are provided interior thereof. These four additional switches 29 are also believed to be readily manually identified by most persons, since once the adjacent corner switch is identified, a person may easily slide their finger along the vertical edge of badge 2 between faces 21, 22 away from the top or bottom, to move from the corner switch to the next switch more to the vertical middle than the corner-most switch. Nevertheless, particularly critical or important functions may be preferred for switches that are most easily and instantaneously identified by touch.

The four corners that delineate the edges of back face 22 are most preferred tactile markers. Most badges are rectangular, such as badge 2 illustrated in FIG. 1. As a result, it is simply convenient to define the perimeter of back face 22 with a similar geometry. While a rectangular parallelepiped exterior for housing 20 is preferred, which provides the aforementioned four corners, in alternative embodiments other prism geometries may be used, including triangular prisms, pentagonal prisms, hexagonal prisms, and so forth. As may be apparent, in these alternative embodiments one switch will preferably be located adjacent to each corner of the back face, and where desired or appropriate additional switches may be located between the corners.

Nevertheless, and as contemplated herein, other structures or devices may be used to define a perimeter of badge holder 10, or to provide suitable and intuitive tactile location. In alternative embodiments, the corners are replaced with other physical characteristic of the housing that are readily identified by touch. For exemplary and non-limiting purpose, the edges of housing 20 between front face 21 and back face 22 may be provided with notches that are each unique and which are adjacent to switches, or housing 20 may be overmolded or otherwise coated with materials that each have a unique and distinctive feel.

Figure 4:
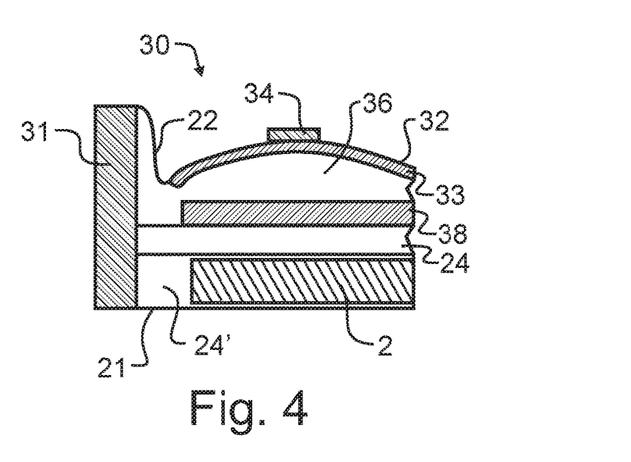
FIG. 4 illustrates the various compartments and one switch by partial sectional view taken along section line 4' of FIG. 2.

In preferred embodiment badge holder 10, as best visible in FIG. 4, at least switch 30 may preferably be recessed within side wall 31. This helps to prevent accidental activation. In alternative embodiments, other means of preventing accidental activation may be provided, for exemplary and non-limiting purposes through partial switch covers that still permit finger contact, adjacent features such as side walls, bumps, or posts that protrude more than the switch, or any other suitable technique.

While not essential in the present invention, it may be preferable to distinguish one or more switches from others of switches 29, 30 by more than physical location. Such distinguishing characteristic may be induced most preferably through touch, or in alternative embodiments through visual cues such as color. Auditory or tactile feedback such as tone confirmation or vibration will in some embodiments be generated responsive to activation of one or more of switches 29, 30. In preferred embodiments, the switches themselves will also provide tactile feedback that will help to confirm the switch has been pressed, such as a tangible "click" or snap of the switch that the person will be able to sense.

Preferred embodiment badge holder 10 optionally provides an additional tactile feature such as protruding dot 34 that is unique to switch 30, to further clearly distinguish switch 30 from other switches 29. Noteworthy here is the fact that the other features to prevent accidental activation described above may also be unique to switch 30, and if so would likewise and additionally or alternatively enable tactile identification unique to switch 30.

While a recessed switch 30 is preferred, in alternative embodiments a protruding switch is used. In yet further alternative embodiments other types of switches such as non-contacting switches are used instead of contacting switch 30. To provide similar tactile identification, various switches may protrude, while others such as illustrated in FIG. 4 may be recessed.

In some alternative embodiments, badge holder 10 is provided with braille markings. In some embodiments badge holder 10 is provided with vibration signals. Each of these can be used to communicate particular switches and otherwise provide additional tactile communication to those trained to understand such markings and signals.

Because badge holder 10 receives and displays a prior art identification or security badge 2, and since such badges are required in nearly all institutions to be worn or displayed at all times, badge holder 10 will be worn directly on a person and will be visible. As a result, badge holder 10 will also be directly accessible without the need for a person to dig in a pocket or return to a desk to access the device. Nevertheless, contemplated herein are alternative embodiment badge holders that may take different form factors, including but not limited to a cellphone case or attachment.

While not separately illustrated, in some embodiments a sensor or other suitable detector may be provided that detects a separation or substantial pull on either the lanyard or lanyard coupling 23. Such a detector, in embodiments where so provided, will initiate a distress transmission to command center 40, and in some embodiments will initiate an illumination of lights and sounds.

While also not separately illustrated, in some embodiments badge holder 10 will also be provided with a microphone. In such case, one or more of switches 29, 30 may activate the microphone, either continuously or for limited time sufficient to provide a short audio file attachment. The audio file may comprise an analog wave file, but in one alternative embodiment the audio file may comprise a digital representation of the analog wave file. In another alternative embodiment, the audio signal may be processed immediately within preferred embodiment badge holder 10 and converted to a text file, using for exemplary and non-limiting purpose a standard such as ASCII, ANSI, or Unicode encoding of the alphabet.

The incorporation of Speech-to-Text in preferred embodiment badge holder 10 offers several benefits. The first benefit is a reduction in transmission bandwidth. This improves operation of the present invention using communications systems and protocols with less bandwidth and greater economies. A second benefit is the ability to incorporate a rules-based, Artificial Intelligence (AI), or other type of decision system into preferred embodiment messaging system 1. Using currently available technologies, such decision systems would require the greater capabilities found in command center 40, and so will be described herein below. However, as technology becomes more capable with smaller power and space required, there is a realistic expectation that in the future even at least some, if not much or all, of the decision processing may occur within badge holder 10. A third benefit is the ability through the further combined incorporation of noise cancellation and voice recognition to allow a badge wearer to activate a switch function through specific voice command, without having to press a switch. For exemplary and non-limiting purpose, a teacher who is using both hands to manage a situation can still call for help. Since badge holder 10 is most nearly adjacent to the badge wearer, noise cancellation can help to reduce other sounds besides the badge wearer's voice.

In further alternative embodiments, badge holder 10 may also incorporate a camera, Wi-Fi, or speaker. In the case of a camera, one or more of switches 29, 30 may activate the camera, either continuously or for limited time sufficient to provide a short video file attachment. Likewise, and where appropriate, a rolling video file may be continuously recorded in the manner of a body cam to provide documentation where necessary or desirable.

In further alternative embodiments, badge holder 10 may also incorporate position sensing. This position sensing may, for exemplary and non-limiting purpose, include such known techniques as: GPS; RFID data exchanges with fixed location RFID readers; WiFi location determination where an available and capable WiFi network extends sufficiently; triangulation, which may be achieved either with dual antennas or a plurality of communications repeaters; "time-of-flight" communication exchanges that establish separation distance; or other suitable techniques known in the communications arts. In embodiments where location information is available, whether generated by devices within badge holders 10 or other apparatus within preferred embodiment messaging system 1, such location information will most preferably be transmitted with or as a part of some or even all of the communications originating from a badge holder 10.

In yet further alternative embodiments, badge holder 10 may incorporate or be used in combination with secondary forms of validation of identification. For exemplary and non-limiting purpose, access through a lock or the like may include communicating badge holder 10 information, and then requiring a secondary validation. Such secondary validation as keycodes, biometric data such as fingerprints or facial recognition, or other suitable techniques may be incorporated either directly within badge holder 10 or through a secondary apparatus through a touch pad or other like or similar apparatus.

Figure 5:
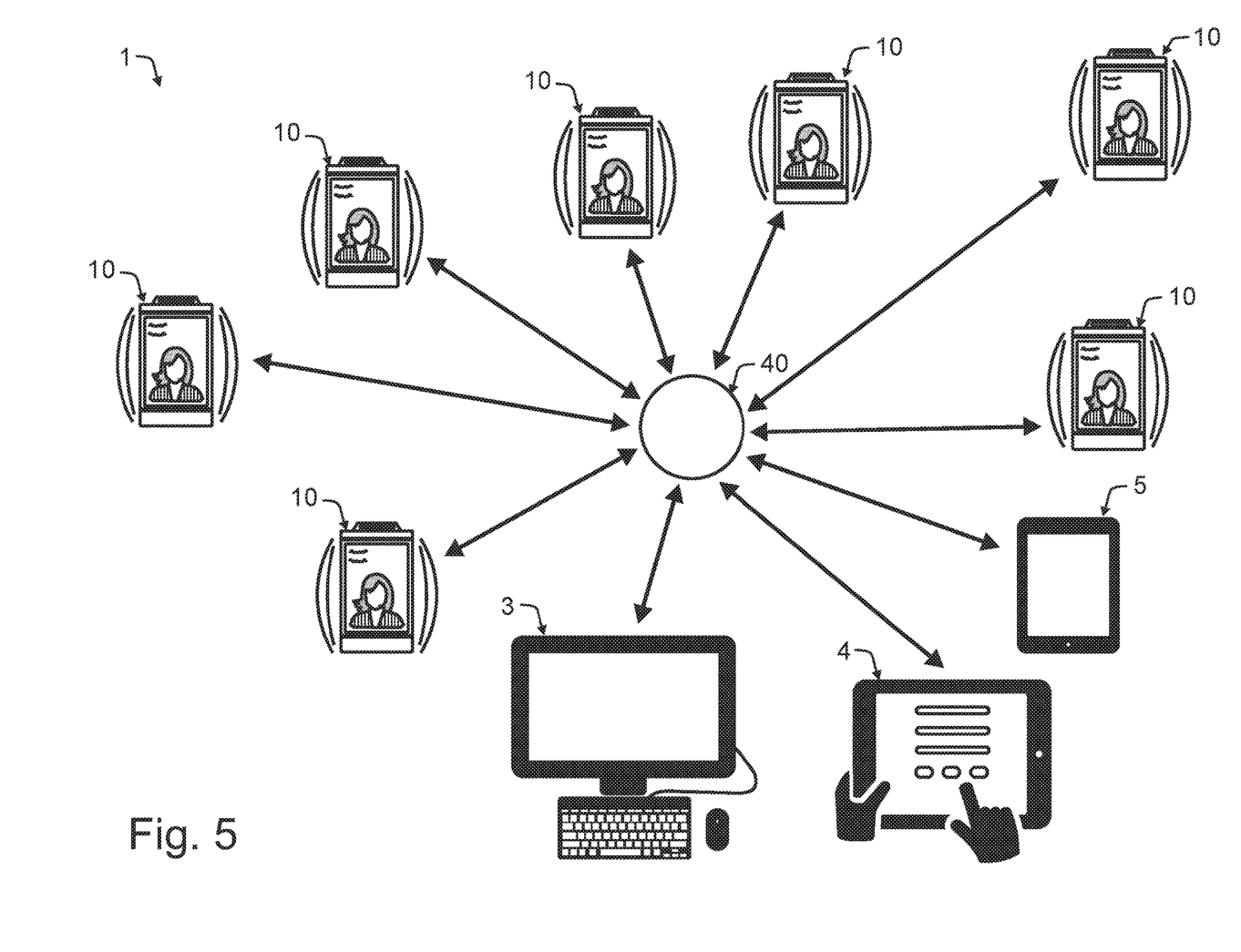
FIG. 5 illustrates a preferred embodiment messaging system incorporating the preferred embodiment badge holder illustrated in FIGS. 1-4.

FIG. 5 illustrates preferred embodiment messaging system 1 incorporating one or more of the preferred embodiment badge holders 10. Preferred embodiment messaging system 1 is preferably a dedicated, self-contained, private, one-touch, bi-directional messaging network. The network is most preferably capable of real-time and post-process message validation, and logged activity tracking.

In preferred embodiment messaging system 1, communications occur through radio signals operating in the 900 MHz range. This allows for long range, low power, obstruction penetrating communication.

Acting as the hub of preferred embodiment messaging system 1 is command center 40. Command center 40 is the head end device that provides primary system control. While not limited thereto, command center 40 may for exemplary purpose take the form of a small minicomputer running a stable and secure operating system, again for exemplary purpose such as a customized version of Linux. Most preferably, a rechargeable battery will be provided for untethered operation, and to ensure operation even in the event of a power outage within the institution.

Command center 40 may preferably be provided with several USB ports that may have various diverse functions. One exemplary function is accepting a "security hardware key" that when present will enable administrative functions such as configuring badges, logging/tracking, remote firmware or software updating, access to video, etc., and will allow specific remote access for external support functions. Another USB port may be used to add additional storage capacity or for other desired purpose. Command center 40 will preferably have web server software running, making it possible to perform configuration and operation functions from any compliant web browser.

Command center 40 will also preferably run a messaging server, enabling notifications to be forwarded to any configured recipients via pages, text, or email. Command center 40 may in some embodiments also incorporate Speech-To-Text capability, so that any analog or digital wave audio attachments can be represented as text, in addition to an audio file, on a command center 40 status page and in any forwarded text or email notifications.

One particular noteworthy capability and benefit of keyword conversion incorporated into some embodiments of the invention, and whether achieved within command center 40 or badge holder 10, is the added capability for rule-based decision making capability within command center 40. With speech converted to text, command center 40 may be programmed to process the text searching for keywords in combination with the particular type of one-touch button request, and provide additional communications, notifications, or information as a result thereof.

There are a number of system functions desired or required within preferred embodiment messaging system 1, many which may be provided through command center 40. For exemplary and non-limiting purpose, these may include: security access configuration of the devices active with preferred embodiment messaging system 1; device status monitoring and logging; communications and notification generation, routing, and relaying; and personnel locating in the event of an emergency event or evacuation.

With regard to security access configuration, command center 40 may for exemplary and non-limiting purpose use encoded serialization and Bluetooth to specifically allow devices such as all badge holders 10, specific mobile devices 4, 5 or computers 3 that will be used by administrative personnel for managing and operating the system to communicate with command center 40. Various configuration functions that may be performed by command center 40 for exemplary purposes may include, but are not limited to:

Adding/deleting/editing badges, including entering names, ID numbers, pictures, room number, etc. for each user;

Defining default badge configurations—identifying what happens when certain notification buttons are pressed, or for exemplary and non-limiting purpose double or triple pressed, or long held, or the like; and     Defining the storage of audio clips and logging of incident records, etc.

With regard to device status monitoring and logging, command center 40 may for exemplary and non-limiting purpose provide a master status page that displays the presence or lack thereof of all configured badge holders 10, specific mobile devices 4, 5 and computers 3 stored within command center 40 as active, a chronological listing of the recent incident items, and button or menu items for initiating any notifications to be sent from command center 40 to all or a subset of configured badge holders 10, specific mobile devices 4, 5 and computers 3.

With regard to communications and notification generation, routing, and relaying, command center 40 will most preferably be able to not only receive communications from badge holders 10, specific mobile devices 4, 5 and computers 3, but also will communicate with them through a wireless bi-directional communications system that operates independent of and without interference with existing infrastructure. As described herein above, a 900 MHz band is preferred, owing to reduced signal obstruction and interference with other common devices. However, other suitable communications channels such as those described in the patents incorporated by reference herein above and those known in the communications arts will be understood to be incorporated in alternative embodiments. A bi-directional communications channel enables command center 40 to broadcast messages to all or select ones of badge holders 10, specific mobile devices 4, 5 and computers 3, and where desired receive response or receipt validation therefrom.

As noted, preferred embodiment messaging system 1 operates on a dedicated radio-frequency communications channel, using rechargeable batteries for untethered operation. As a result, both command center 40 and badge holders 10 are mobile. In the event communications beyond the reliable reach of a single transmission are required, repeaters may be provided as required to adequately provide communication to an area of interest.

With regard to personnel locating in the event of an emergency event or evacuation, and as noted above, command center 40 and badge holders 10 are most preferably provided in a mobile form factor and are provided with an internal battery. This allows command center 40 to be moved outside of a building in the event of an emergency event or evacuation, and badge holders 10 can still be polled to determine whether all personnel provided with badge holders 10 are accounted for. If any remain within the building, and provided the building systems are still active, command center 40 may then also be able to locate the remaining badge holders 10. In the event the building systems are inactive, command center 40 may instead be able to use alternative techniques to locate the remaining badge holders 10. This may, for exemplary and non-limiting purpose, include such techniques as: GPS or RFID data exchanges, where badge holders 10 are so enabled; WiFi location determination where an available and capable WiFi network extends sufficiently; triangulation, which may be achieved either with dual internal antennas or sequential physical displacements of command center 40 followed by signal strength determinations; "time-of-flight" communications exchanges that establish separation distance; or other suitable techniques known in the communications arts.

Of particular note, since command center 40 is mobile, command center 40 or an equivalent device may be used in association with a school bus, field trip, or the like as well. In such instance, suitable badge holders 10, with or without identification badges 2 and potentially with only nominal student identifiers, may be provided to each student. When command center 40 is enabled, and badge holders 10 if so required, then the aforementioned location aware data can be used to track students getting onto a bus and off of the bus. This may be useful to ensure that the busses are picking up and delivering the appropriate students, or that the students and teachers actually in attendance on a field trip are located and accounted for.

In a most preferred embodiment, provided for purposes of illustration of the present invention but not solely limiting thereto, one application for a preferred embodiment messaging system 1 is for pre-K through 12 school communications. In such application, badge holders 10 will be worn by teachers, administrators, and other school or institutional personnel. Preferred embodiment messaging system 1 enables a badge holder 10 wearer to instantly initiate a number of configurable notifications, with one press of a button. This provides quick, convenient, and efficient communication and notification in an environment that demands fast responses/actions.

For such an environment, exemplary and non-limiting standard notifications may include:

Lock-down and Fire-drill, both with time stamped status and compliance;

Medical—i.e. student illness or injury;

Disciplinary—i.e. troublemaker(s) in a classroom with a teacher requiring assistance;

Janitorial—i.e. supply restocking, vomit cleanup, etc.;

Emergency—i.e. physical danger to staff or students; and     Unknown Stranger—i.e. a person is present in the building without a visitor badge, etc.

As may be apparent, the aforementioned list of notifications includes six distinct situations. In addition to configurable switches that may represent these six situations, there may also be configured a "confirmation" switch, and a switch for initiating a voice attachment. At the option of each particular school, these may be grouped into fewer or more categories as desired, allowing an institution flexibility to determine how to best implement different needs of a badge holder 10 wearer. However, preferred embodiment badge holders 10 are illustrated in FIG. 2 as having a total of eight distinct switches.

As already noted herein above, badge holders 10 may preferably include a microphone for the primary purpose of attaching a verbal description to a notification, but also for providing live audio feed in particular emergency situations. Multi-colored LED lights and a buzzer may also be provided within badge holders 10 to serve as confirmation for an issued request, if so desired, to signal distress as in a broken lanyard described herien above, or to signal an incoming call or message from command center 40.

In further alternative embodiments, a Liquid Crystal Display (LCD) may be provided to facilitate provision of instructions, messages, and any other information that may be displayed thereupon. In such embodiments, housing 20 may be expanded in size to make room for the LCD on back face 22, switches 29 and 30 may be reduced in size to make room for the LCD on back face 22, one or more switches 29, 30 may be removed and replaced by the LCD, or other provision may be made. When a display is provided, the display will preferably remain active throughout an event. For exemplary purpose, in an emergency lock-down, each badge holder 10 provided with a display will preferably continuously provide at least current status, thereby maintaining critical status communication to all badge holders.

Where desired, either or both of badge holders 10 and command center 40 may be provided with a Bluetooth™ component. In such case, this allows pairing with a Bluetooth™ earpiece or headset, enabling better audio performance than an integrated microphone, and making it possible for command center 40 to include an audio component to messages initiated at command center 40, such as fire drill instructions, lock-down information, tornado shelter instructions, and the like.

Other known augmentations may be provided, such as supplemental battery packs, additional connectors, and other features as may be desired or defined.

As may be apparent, preferred embodiment messaging system 1 including badge holders 10, specific mobile devices 4, 5 and computers 3, and command center 40 offers many advantages over the prior art. Badge holders 10 consist of a simple and intuitive device that is always with the user, most preferably as a wearable and displayed device. Preferred embodiment messaging system 1 uses a proprietary network and links to a base station that can become mobile. This system does not use other networks. It is not dependent on cellular, WiFi, Bluetooth™, existing ethernet, and related infrastructure. The system continues to operate in power outages or cellular congestion sometimes occurring in emergency situations.

Most critically, badge holder 10 enables prompt signaling with a single button press. A wearer such as a teacher can maintain focus and eye-contact with a person, hazard, or situation while simply one-touch requesting appropriate assistance. A digital signal is sent promptly.

In addition, preferred embodiment messaging system 1 is limited in use and purpose to valid communication and signaling that meets the organization's policy. This means there is no temptation for unnecessary use for personal communication. In addition, there are no incoming calls, notifications, or text messages that can disrupt focus and attention. The only incoming calls to a badge are those coming from command center 40, and a teacher of other personnel will know that the incoming message is important. Furthermore, owing to the short burst communications and only valid need, battery life is great and with reasonable batteries will extend through many days.

While various methods of implementation are contemplated herein, and so will not be limited to any particular approach, one preferred method of operation of preferred embodiment messaging system 1 is for routing of signals and messages to appropriate personnel, as noted herein above. For exemplary and non-limiting purpose, activation of a switch 29 associated with a need for janitorial assistance may be automatically routed to a custodian, and may optionally include a short audio clip to identify the particular need. This allows the custodian to be informed, just as soon as the custodian becomes available, and enables the custodian to bring any necessary supplies and equipment, both enabled by only a few seconds of required communications time.

In another exemplary and non-limiting implementation, a teacher recognizing an escalating student or situation may very discretely request assistance from an aid or other suitable school personnel through a single touch of one of buttons 29. This may be done without student awareness, and in advance of a negative action that would have adverse consequences to the student, others, or the school.

In addition, switch 30 as described herein above may be generically termed the "Emergency Help" button which will in a preferred embodiment have a touch-based indicator such as protruding dot 34. This combination of a slight dome for the general button actuator area 32, together with a small protruding dot 34 in the center to allow a person to uniquely identify this button by touch, without fumbling or losing eye contact with another person in a particularly important or critical situation.

This "Help" button will in various alternative embodiments have different meaning to different organizations, and even different organizations of the same type. For example, one school may affiliate the "Help" button with a request for assistance from office personnel such as an assistant principal or guidance counselor, another school may associate it with a request for assistance from a hall monitor, and yet another may send volunteers from a student organization.

For more serious emergencies such as fire or lock-down, some organizations may elect to invoke a two-button combination, both buttons that must be held for a minimum time interval, to reduce the chance of false alarms. Once again, different organizations may request different interpretations and implementations. One organization may require voice affirmation of a fire or lock-down to avoid false alarms, while another may prefer false alarms over slowing response to an actual emergency.

Those of skill in the electronics and computer arts will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A school messaging system comprising, in combination, at least one school teacher badge holder and a command center, said at least one school teacher badge holder comprising:
  a housing having a front face and a rear face, said front face and said rear face opposed to each other;
  a pocket adjacent to said front face and configured to receive and display a school teacher identification badge, said school teacher identification badge visible from said front face;
  a coupling configured to affix said at least one school teacher badge holder with a school teacher while displaying said front face and said identification badge;
  a plurality of switches including an emergency switch, a teacher's aid switch, a janitorial assistance switch, and a medical assistance switch, said plurality of switches located on said rear face and concealed from said front face;
  individual ones of said plurality of switches located at tactually identifiable unique locations, each individual one of said plurality of switches uniquely positioned and tactually distinguishable relative to others of said plurality of switches and thereby configured to be selectively acuatable by said school teacher while said school teacher maintains eye contact with at least one of a student or situation requiring full attention;
  said emergency switch having an emergency tactile feature uniquely associated with said emergency switch and distinct from said tactually identifiable unique locations; and
  communications circuitry operative responsive to single touch activation of a one of said plurality of switches to initiate communications with said command center uniquely identifying at least a location of said at least one badge holder and at least one indicator of desired action associated with said one of said plurality of switches, wherein different ones of said plurality of switches will generate different indicators of desired action, and wherein said emergency switch generates an indicator of an emergency condition;

said command center comprising:
  communications circuitry operative to communicate with said at least one school teacher badge holder; and
  processor circuitry configured to generate actions and communications responsive to said communications with said at least one school teacher badge holder identifying at least a location of said at least one school teacher badge holder and at least one indicator of desired action.

2. The school messaging system of claim 1, wherein said each individual one of said plurality of switches further comprise a unique tactile configuration distinct from said others of said plurality of switches and distinct from said emergency tactile feature.

3. The school messaging system of claim 1, wherein said emergency tactile feature further comprises a recessed switch.

4. The school messaging system of claim 1, wherein said emergency tactile feature further comprises at least one unique emergency switch geometry.

5. The school messaging system of claim 1, wherein said at least one school teacher badge holder further comprises at least one corner defined by an outer perimeter of said rear face, and a switch located adjacent to said at least one corner.

6. The school messaging system of claim 5, wherein said at least one school teacher badge holder at least one corner further comprises a plurality of corners, and a switch located adjacent to each one of said plurality of corners.

7. A badge holder, comprising:
  a housing having a front face and a rear face, said front face and said rear face opposed to each other;
  an identification badge visible on said housing front face;
  a coupling configured to affix said badge holder with a person while displaying said identification badge;
  a plurality of switches accessible on said housing rear face, concealed from said front face, and including an emergency switch;
  individual ones of said plurality of switches located at tactually identifiable unique locations, each individual one of said plurality of switches uniquely positioned and tactually distinguishable relative to others of said plurality of switches;
  said emergency switch having an emergency tactile feature uniquely associated with said emergency switch and distinct from said tactually identifiable unique locations; and
  communications circuitry operative responsive to single touch activation of a one of said plurality of switches to initiate communications with a command center, said communications uniquely identifying said at least one badge holder and at least one indicator of desired action associated with said one of said plurality of switches, wherein different ones of said plurality of switches will generate different indicators of desired action, and wherein said emergency switch generates an indicator of an emergency condition.

8. The badge holder of claim 7, wherein said housing further comprises a pocket configured to receive said identification badge.

9. The badge holder of claim 7, wherein said communications uniquely identify a location of said at least one badge holder.

10. The badge holder of claim 7, wherein said each individual one of said plurality of switches further comprise a unique tactile identification distinct from said others of said plurality of switches and distinct from said emergency tactile feature.

11. The badge holder of claim 7, wherein said emergency tactile feature further comprises a recessed switch.

12. The badge holder of claim 7, wherein said emergency tactile feature further comprises at least one unique emergency switch geometry.

13. The badge holder of claim 7, wherein said badge holder further comprises at least one corner defined by an outer perimeter of said rear face, and a switch located adjacent to said at least one corner.

14. The badge holder of claim 13, wherein said badge holder at least one corner further comprises a plurality of corners, and a switch located adjacent to each one of said plurality of corners.

15. A badge holder, comprising:
- a housing having a front face and a rear face, said front face and said rear face opposed to each other;
- a pocket adjacent said front face configured to receive and contain an identification badge, while visibly displaying said identification badge at said housing front face;
- a coupling configured to affix said badge holder with a person while displaying said identification badge;
- a plurality of switches including an emergency switch accessible on said housing and located on said rear face concealed from view;
- individual ones of said plurality of switches located at tactually identifiable locations, each individual one of said plurality of switches uniquely positioned relative to others of said plurality of switches;
- said emergency switch having an emergency tactile feature uniquely associated with said emergency switch and distinct from said tactually identifiable locations; and
- communications circuitry operative responsive to single touch activation of a one of said plurality of switches to initiate communications with said command center uniquely identifying at least a location of said at least one badge holder and at least one indicator of desired action associated with said one of said plurality of switches, wherein different ones of said plurality of switches will generate different indicators of desired action, and wherein said emergency switch generates an indicator of an emergency condition.

16. The badge holder of claim 15, wherein said each individual one of said plurality of switches further comprise a unique tactile configuration distinct from said others of said plurality of switches and distinct from said emergency tactile feature.

17. The badge holder of claim 16, wherein said at least one badge holder further comprises a plurality of corners defined by an outer perimeter of said rear face, and wherein an individual one of said plurality of switches is uniquely located adjacent to a one of said plurality of corners.

18. The badge holder of claim 15, wherein said emergency tactile feature further comprises protrusions immediately adjacent to said emergency switch.

19. The badge holder of claim 15, further comprising an emergency switch accidental activation prevention apparatus.

* * * * *